United States Patent
Sbabo

(10) Patent No.: US 9,791,092 B2
(45) Date of Patent: Oct. 17, 2017

(54) FRAME FOR A PACKAGING MACHINE

(71) Applicant: MONDO SERVIZI S.R.L., Vicenza (IT)

(72) Inventor: Morgan Sbabo, Schio (IT)

(73) Assignees: MONDO SERVIZI S.R.L., Vicenza (VI) (IT); Morgan Sbabo, Schio (VI) (IT)

( * ) Notice: Subject to any disclaimer, the term of this patent is extended or adjusted under 35 U.S.C. 154(b) by 506 days.

(21) Appl. No.: 14/388,875

(22) PCT Filed: Mar. 28, 2013

(86) PCT No.: PCT/EP2013/000950
§ 371 (c)(1),
(2) Date: Sep. 29, 2014

(87) PCT Pub. No.: WO2013/149718
PCT Pub. Date: Oct. 10, 2013

(65) Prior Publication Data
US 2015/0052856 A1    Feb. 26, 2015

(30) Foreign Application Priority Data

Apr. 3, 2012    (IT) ............... VI2012A0078

(51) Int. Cl.
*B65B 9/06*    (2012.01)
*F16M 1/08*    (2006.01)
(Continued)

(52) U.S. Cl.
CPC ............. *F16M 1/08* (2013.01); *B65B 9/06* (2013.01); *B65B 65/003* (2013.01); *F16M 1/00* (2013.01);
(Continued)

(58) Field of Classification Search
CPC .. B65B 9/02; B65B 9/06; B65B 65/00; B65B 65/003; F16M 1/00; F16M 1/08;
(Continued)

(56) References Cited

U.S. PATENT DOCUMENTS 2,334,029 A * 11/1943 Ranney et al. ........... B65B 9/06
53/133.7
3,046,714 A * 7/1962 Malicay ................. B65D 73/02
47/56
(Continued)

FOREIGN PATENT DOCUMENTS

DE        2215225 A1 * 10/1973 ............... B65B 9/06
DE   102005057265 A1 *  6/2007 ............... B65D 9/06
(Continued)

OTHER PUBLICATIONS

PFM Packaging Machinery Mistral, Sep. 28, 1999.
International Search Report for PCT/EP2013/000950 dated Jul. 24, 2013, 3 pages.

*Primary Examiner* — Stephen F Gerrity
(74) *Attorney, Agent, or Firm* — Collard & Roe, P.C.

(57) ABSTRACT

There is provided a frame for a horizontal flow-pack packaging machine utilizing a center folded or side sealing machine with twin reel or reel feed form below, suitable for packaging a food product or a non-food product with heat sealable or cold weldable plastic film wound on a reel. The frame is provided with two cantilevered supports arranged one above the other in parallel, the lower support supports the operating mechanical components of the packaging machine and the upper support supports the control group and the pneumatic system of the packaging machine.

6 Claims, 3 Drawing Sheets

(51) Int. Cl.

| | | |
|---|---|---|
| *F16M 1/00* | (2006.01) | |
| *F16M 9/00* | (2006.01) | |
| *B65B 65/00* | (2006.01) | |
| *F16M 3/00* | (2006.01) | |
| *B29C 65/00* | (2006.01) | |
| *B29C 65/02* | (2006.01) | |
| *B29C 65/78* | (2006.01) | |

(52) U.S. Cl.
CPC ............... *F16M 3/00* (2013.01); *F16M 9/00* (2013.01); *B29C 65/02* (2013.01); *B29C 65/787* (2013.01); *B29C 66/133* (2013.01); *B29C 66/4312* (2013.01); *B29C 66/4322* (2013.01); *B29C 66/81465* (2013.01); *B29C 66/83413* (2013.01); *B29C 66/849* (2013.01)

(58) Field of Classification Search
CPC . F16M 3/00; F16M 9/00; F16M 11/00; F16M 11/20
USPC ....... 53/545, 548, 550, 553, 393; 248/163.1, 248/163.2, 188.1, 440, 440.1, 676, 677
See application file for complete search history.

(56) References Cited

U.S. PATENT DOCUMENTS

| | | | | |
|---|---|---|---|---|
| 3,555,774 | A * | 1/1971 | Craig | ............... B65B 41/16 242/420.1 |
| 3,650,089 | A * | 3/1972 | Miller et al. | ............ B65B 65/02 198/577 |
| 4,272,944 | A * | 6/1981 | Suga | ................ B65B 31/04 53/511 |
| 4,757,668 | A | 7/1988 | Klinkel et al. | |
| 4,947,605 | A * | 8/1990 | Ramsey | ................ B65B 9/073 53/252 |
| 5,085,036 | A * | 2/1992 | Evans et al. | ............ B29C 53/50 493/302 |
| 5,381,640 | A * | 1/1995 | Chiu | ................ B65B 9/073 53/374.9 |
| 5,467,580 | A * | 11/1995 | Francioni | ............... B65B 9/067 53/389.4 |
| 5,519,983 | A * | 5/1996 | Moen | ................... B65B 9/073 53/373.5 |
| 6,266,948 | B1 * | 7/2001 | Serra | .................... B65B 7/22 493/182 |
| 6,711,880 | B2 * | 3/2004 | Wipf et al. | ................ B65B 9/06 53/203 |
| 2001/0023570 | A1 * | 9/2001 | Handel | .................. B65B 25/08 53/156 |
| 2003/0051438 | A1 * | 3/2003 | Loewenthal et al. | ..... B65B 9/06 53/266.1 |
| 2005/0022481 | A1 * | 2/2005 | Ballestrazzi et al. | ... B65B 9/026 53/553 |
| 2009/0126319 | A1 * | 5/2009 | Sperry et al. | ............. B65B 9/02 53/433 |

FOREIGN PATENT DOCUMENTS

| | | | |
|---|---|---|---|
| EP | 0114084 A2 * | 7/1984 | |
| FR | 1409922 A * | 9/1965 | ............... B65B 9/06 |
| FR | 2 440 313 | 5/1988 | |
| JP | 61024428 A * | 2/1986 | ........... B31D 5/0073 |
| JP | 4620787 B2 * | 1/2011 | ............... B65B 9/06 |
| WO | WO 2007/091284 A1 | 8/2007 | |

* cited by examiner

FRAME FOR A PACKAGING MACHINE

CROSS REFERENCE TO RELATED APPLICATIONS

This application is the National Stage of PCT/EP2013/000950 filed on Mar. 28, 2013, which claims priority under 35 U.S.C. §119 of Italian Application No. VI2012A000078 filed on Apr. 3, 2012, the disclosures of which are incorporated herein by reference. The international application under PCT article 21(2) was published in English.

The present invention relates to an improved horizontal flow pack packaging machine.

As it is well known to industrial machine designers, a support frame must substantially satisfy two requisites: it must be sufficiently strong so as to be able to support all the mechanical components necessary for the operation of the machine and, at the same time, it must have minimal bulk, thus being as small as possible.

Such a rational construction of the frame is particularly necessary in packing machines, such as packaging machines of the most different types, known by the commercial term "horizontal flow-pack," using a centre folded or side sealing machine, with twin reel or reel feed from below, suitable for packaging a product that may or may not be a food product, through the use of plastic films, heat-sealable or cold welded, wound in a reel.

First models of such machines that appeared on the market had a frame that was made up of a cast iron box, which was positioned below the working area and which had considerable dimensions, so as to be able to contain the actuation apparatuses, which included electric motors, chains and drive shafts and where the electric compartment was made up of a small box, which also acted as a control panel. As progress was made in terms of technology the mechanical actuation apparatuses were gradually replaced by electronic actuation apparatuses with consequent increase of the dimensions of the electrical system, integrated in the machine.

Substantial progress was made with the introduction of so called "simple cantilever frames", in which the box containing the mechanical control components and the electric installation is positioned laterally with respect to the working area, which is moved to the side and is mounted cantilevered.

In practice, such a construction solution (as an example we shall mention patent document U.S. Pat. No. 4,947,605) has the advantage that, with the mechanical operation components arranged cantilevered, the area under the product being packaged is free, thus making it possible to have greater cleanliness, preventing material, which when of the food product type is source of bacteria and mould, from gathering.

On the other hand, again in practice, the presence of the box again constitutes a bulk, which causes there to be a waste of space and allows only the cantilevered side to be accessible, with the consequence of having a considerable waste of time in the case in which the worker has to intervene on the opposite side.

The purpose of the present finding is that of making a support frame for packaging machines, which does not have the drawbacks of similar known products.

Such a purpose is achieved by making a frame which is provided with two cantilevered supports, arranged parallel and over one another and in which the lower support sustains the mechanical operation components, whereas the upper support sustains the electrical control group and, possibly, also the pneumatic system.

Specifically, the lower support places the mechanical components at the height of a work plane that is accessible to the worker, from 70/90 cm from the ground, whereas the upper support sustains the control group at a height that is greater than the human stature, advantageously above 2 meters from the ground.

The finding shall become clearer with the description of a possible embodiment thereof, given only as an example and not for limiting purposes, with the help of the attached drawing tables, in which.

Figure 1:
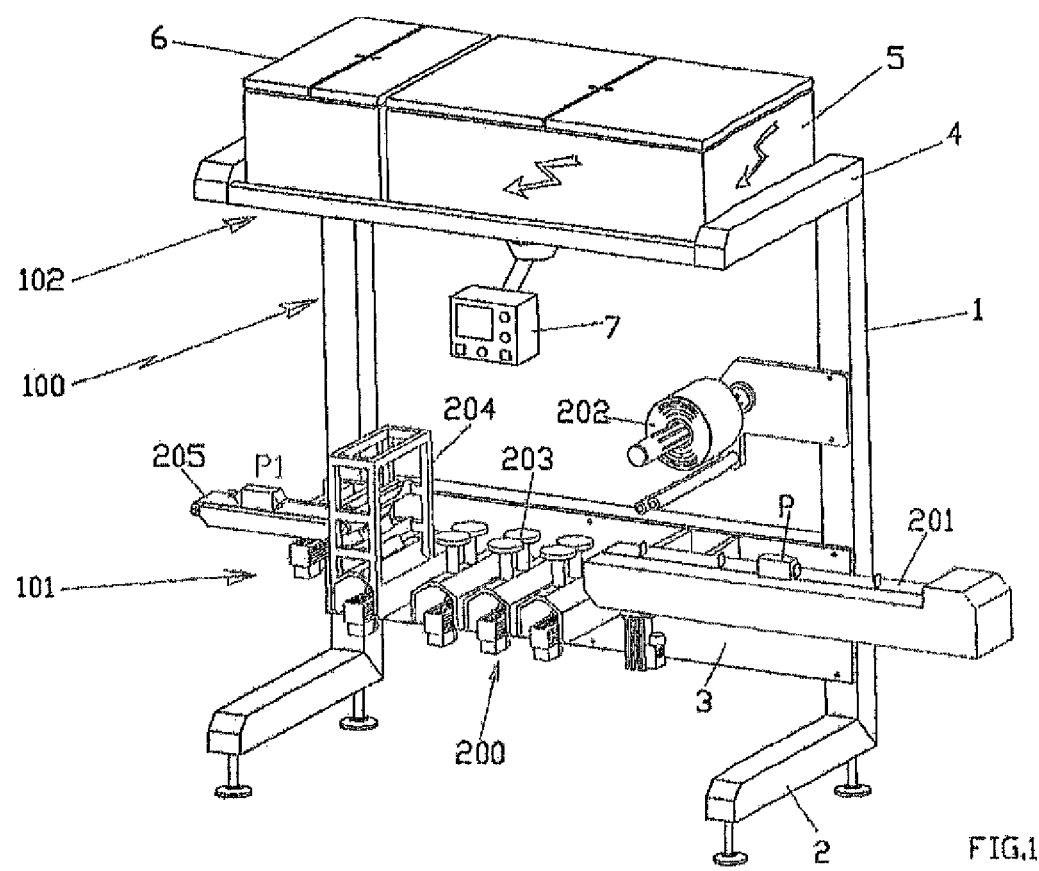
FIGS. 1, 2 represent two views, a perspective front view and a view from the top, respectively, of a packaging machine equipped with the support frame according to the finding.

As visible in FIG. 1, a packaging machine, of the so called flow-pack type, is equipped with a support frame, indicated with reference numeral 100, in its most basic form, resembling a welded structure shaped like a capital "E", formed from a tube or made from folded sheet metal, in which there are a first lower cantilevered support, generically indicated with reference numeral 101, only supported on one side and at the ends through the two uprights 1; said uprights support a second cantilevered support, in a higher position, generically indicated with reference numeral 102.

Constructively, the frame is made up of two uprights 1, equipped with a horizontal base 2, which support a transverse plate 3 on which all the mechanic components are mounted cantilevered, indicated with reference numeral 200 and that, specifically in the machine, comprises a belt 201 for feeding the products P, a reel of heat-sealing film 202, a welding group 203, a cut and sew group 204 and a belt 205 for discharging the packaged product P1.

The two uprights 1 end, at the top, with a cantilevered shelf, indicated with reference numeral 4, on which rest a box 5, which encloses the electric installation and, possibly, also the pneumatic system; again, the control panel 7, with buttons and an interface display for controlling the machine, is applied onto said shelf.

Figure 2:
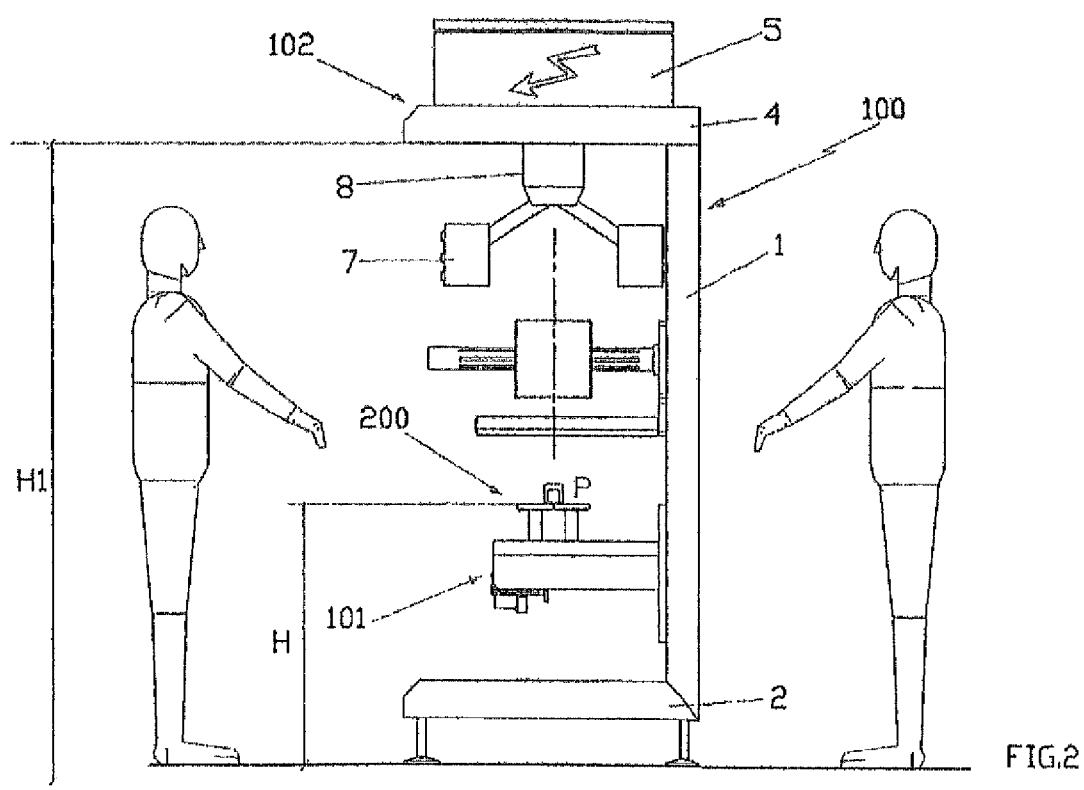

As visible, in particular, in FIG. 2, with the specific shape of the frame 100 according to the finding it is possible for a person in charge to work in a perfectly ergonomic way, since he can act at both sides of the machine, controlling it from a single control panel 7, since it is sustained by a rotating arm 8, with the mechanical components 200 positioned on the lower cantilevered support 101, which is at the right height "H" from the ground and with all the electric and pneumatic components positioned on the upper cantilevered support 102, arranged at a height "H1" that is greater than the human stature, with the purpose of protecting the head of the worker when intervening on the work surface.

Figure 3:
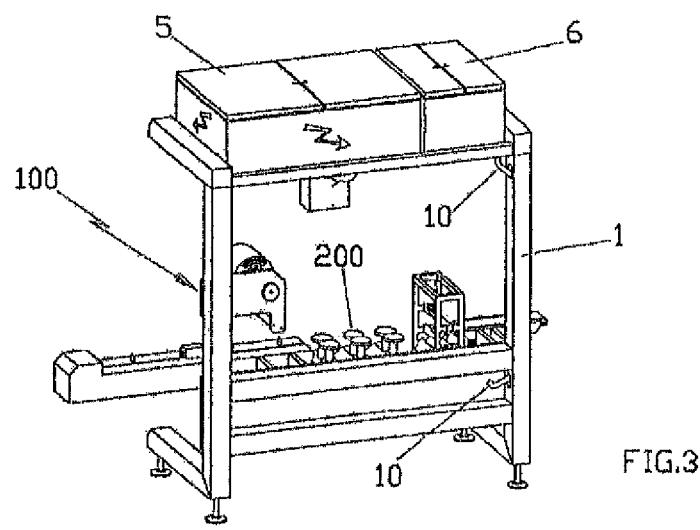
FIGS. 3, 4, 5 represent three perspective views of the machine according to FIG. 1, with constructive details.

Moreover, as visible in FIG. 3, the substantially tubular structure of the frame 100 allows the passage of the electric wires 10 inside the uprights 1, to where they reach the motors that actuate the mechanical components 200, in complete safety.

Figure 4:
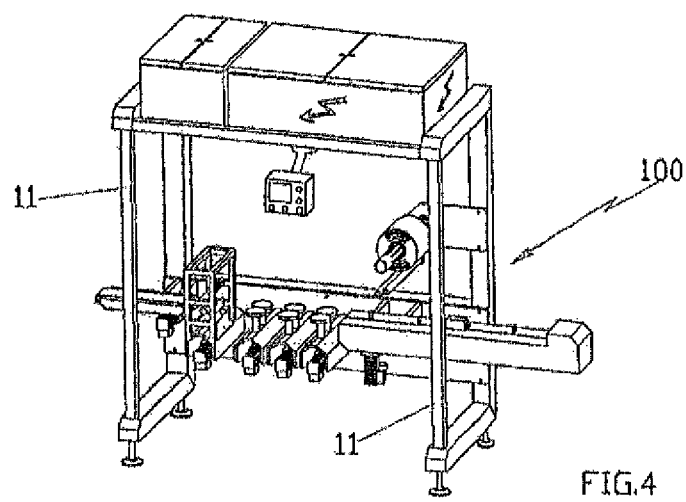

Moreover, as visible in FIG. 4, in the case in which the machine is equipped with control members that can weigh down the boxes 5 and/or 6 or when the mechanical members are very stressed, it is sufficient to add some reinforcement rods 11 to the frame 100, so as to strengthen the structure of the frame 100.

Figure 5:
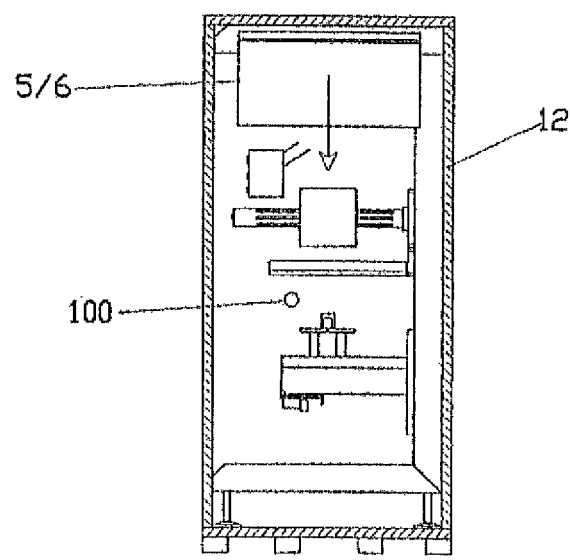

Moreover, as visible in FIG. 5, the finding foresees the possibility of being able to temporarily lower the boxes 5 and 6, bringing them back inside the frame 1, so as to facilitate the positioning of the machine, completely mounted, inside a shipping container 12, with standard height.

Figure 6:
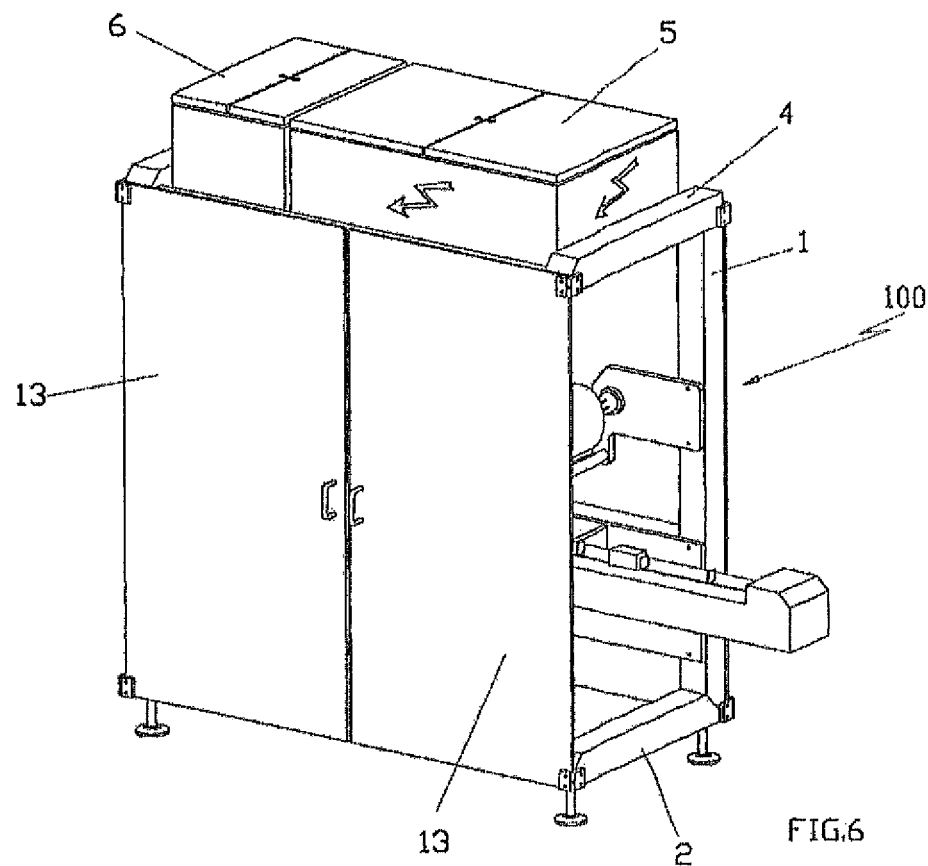
FIGS. 6, 7 represent a perspective front view and a view from the top, respectively, of the machine according to FIG. 1, equipped with safety guards.
Figure 7:
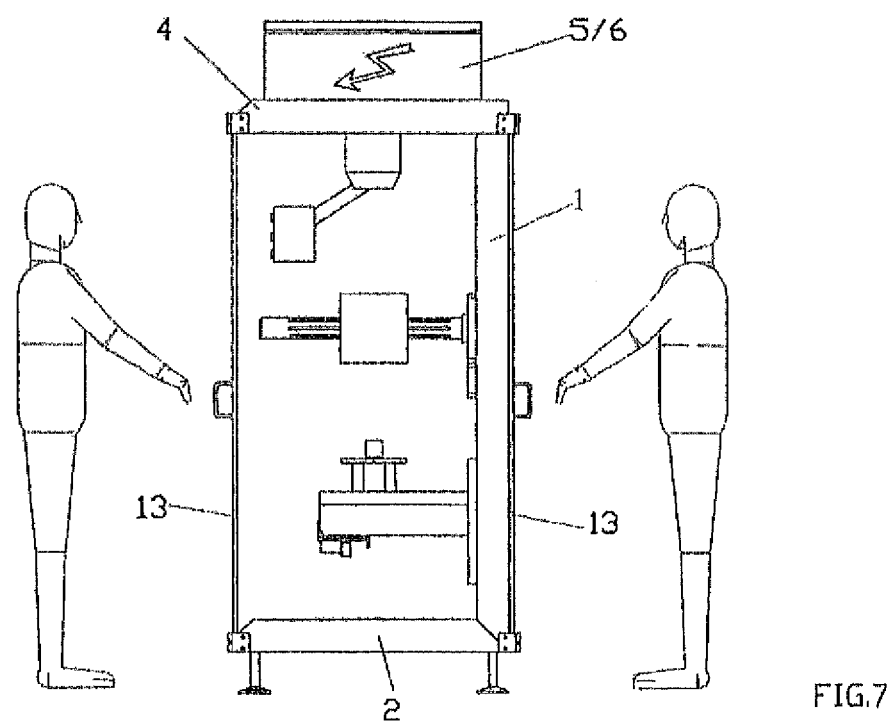

Finally, as visible in FIGS. 6 and 7, the shape of the frame 100 makes it possible for the safety doors 13 to be applied, advantageously made from transparent polycarbonate, on the two sides of the machine, which is thus conceived very rationally and has a small bulk.

From what has been outlined above it can be understood that the proposed purposes have been achieved, since the use of the frame according to the finding makes it possible to obtain:

a machine that is accessible, by the workers, from both the right and left side, even simultaneously;

the possibility of completely eliminating process waste since said materials, falling on the ground, can be easily removed;

the drastic reduction of the side bulk;

the rationalization in the positioning of the components, leaving the field of view of the worker completely free, avoiding interference with his head;

the rationalization of the side safety protection elements;

the almost complete elimination of the risk of a worker, using the electric installation, being electrocuted.

Of course, the dimensions, the materials and the technical components of the frame according to the finding can be wide-ranging, as long as it is all covered by the inventive concept defined by the following claims.

The invention claimed is:

1. In a center folded or side sealing horizontal flow pack packaging machine having first and second sides suitable for packaging a product in heat sealed or cold welded plastic film, said packaging machine having mechanical operating components (200), an electrical control group, and a support frame (100) for supporting said mechanical operating components and said electrical control group, said mechanical operating components (200) including a feed belt (201) for feeding the product to the packaging machine, a reel of heat sealing plastic film (202), a welding group (203), a cut and sew group (204), and a discharge belt (205) for discharging packaged products from the packaging machine, said electrical control group including a box (5) housing said electrical control group for controlling the mechanical operating components (200), said support frame (100) including two spaced apart uprights (1) aligned along the first and second sides of said packaging machine, said mechanical operating components (200) being mounted cantilevered on said support frame (100) on the first side of said packaging machine at a height of about 70 to 90 centimeters and defining there below an open area, the improvement comprising:

said support frame (100) further including an upper cantilevered support (102) disposed parallel to and vertically spaced from and aligned with said mechanical operating components (200), said upper cantilevered support (102) being supported by said two spaced apart uprights (1) at a height of more than 2 meters and supporting said box (5) housing the electrical control group for said mechanical operating components (200), whereby said mechanical operating components (200) are accessible to an operator of said packaging machine from the first and second sides of said packaging machine and the open area underlying the cantilevered mounted mechanical operating components (200) is open and accessible for cleaning.

2. The packaging machine according to claim 1, wherein said support frame (100) has an "E" shape and is formed of welded tubular metal.

3. The packaging machine according to claim 1, wherein said support frame (100) has an "E" shape and is formed of welded sheet metal.

4. The packaging machine according to claim 1, wherein said spaced apart uprights (1) of said support frame (100) include a horizontal base (2), a transverse plate (3) extending between said uprights (1) to which said mechanical operating components (200) are mounted cantilevered, and at an upper end of said uprights (1) a cantilevered shelf (4) of said upper cantilever support (102) is provided supporting a box (6) housing a pneumatic system, and mounting on said shelf (4) a control panel (7) supported by a rotating arm (8) and having control buttons and an interface display for controlling the packaging machine.

5. The packaging machine according to claim 4, which further includes reinforcement rods (11) supporting an end of said upper cantilevered support (102) opposing a cantilevered end thereof and extending to said horizontal base (2).

6. The packaging machine according to claim 1, which further includes transparent polycarbonate safety doors (13) applied at the first and second sides of said packaging machine.

\* \* \* \* \*